(12) United States Patent  
Schwoerer (10) Patent No.: US 10,587,305 B2  
(45) Date of Patent: Mar. 10, 2020

(54) DATA TRANSMISSION/RECEPTION BY FREQUENCY HOPPING

(71) Applicant: ORANGE, Paris (FR)

(72) Inventor: Jean Schwoerer, Grenoble (FR)

(73) Assignee: Orange, Paris (FR)

(*) Notice: Subject to any disclaimer, the term of this patent is extended or adjusted under 35 U.S.C. 154(b) by 0 days.

(21) Appl. No.: 16/306,857

(22) PCT Filed: Jun. 19, 2017

(86) PCT No.: PCT/FR2017/051606  
§ 371 (c)(1),  
(2) Date: Dec. 3, 2018

(87) PCT Pub. No.: WO2017/220912  
PCT Pub. Date: Dec. 18, 2017

(65) Prior Publication Data  
US 2019/0149189 A1 May 16, 2019

(30) Foreign Application Priority Data  
Jun. 22, 2016 (FR) ..................... 16 55816

(51) Int. Cl.  
*H04B 1/713* (2011.01)  
*H04B 1/7136* (2011.01)  
*H04L 5/00* (2006.01)

(52) U.S. Cl.  
CPC ......... *H04B 1/7136* (2013.01); *H04L 5/0012* (2013.01); *H04L 5/0053* (2013.01); *H04B 2001/71367* (2013.01)

(58) Field of Classification Search  
CPC ........ H04B 1/7136; H04B 2001/71367; H04L 5/0053; H04L 5/0012

(Continued)

(56) References Cited

U.S. PATENT DOCUMENTS 5,463,659 A * 10/1995 Nealon ................. H04B 1/713  
375/133  
2004/0228267 A1 11/2004 Agrawal et al.  
(Continued)

FOREIGN PATENT DOCUMENTS

GB 2 277 231 B 3/1995  
WO 2004054280 A2 6/2004

OTHER PUBLICATIONS

The Written Opinion of the International Search Authority for the International Application No. PCT/FR2017/051606 dated Sep. 22, 2017.

(Continued)

*Primary Examiner* — Don N Vo  
(74) *Attorney, Agent, or Firm* — Haverstock & Owens LLP

(57) ABSTRACT

The invention relates to a method for the telecommunication of data by frequency hopping in a first frequency band, wherein the frequency hops follow a predetermined time sequence, known at least to a data transmitter, characterized in that it comprises the following steps implemented by said data transmitter:

defining, from a pseudo-random sample, successive values of respective differences in frequency ($\Delta fs1$, $\Delta fs2$, $\Delta fs3$, ... ; $\Delta fd1$, $\Delta fd2$, $\Delta fd3$, etc.) in order to determine the hopping time sequence starting at a first frequency ($f1$), transmitting to at least one data receiver
  at a first frequency ($f1$), said first frequency being randomly selected (S1) within the first frequency band,
  then at successive frequencies (S5) which, starting at the first frequency, comply with said successive values of respective differences in frequency, said successive values of differences in frequency defin- (Continued)

ing, at reception, a succession of reception frequencies for useful data to be received from said data transmitter.

15 Claims, 3 Drawing Sheets

(58) Field of Classification Search
USPC .................................................. 375/132–138
See application file for complete search history.

(56) References Cited

U.S. PATENT DOCUMENTS

| | | | | |
|---|---|---|---|---|
| 2006/0198426 A1* | 9/2006 | Partyka | .................. | H04B 1/713 |
| | | | | 375/133 |
| 2008/0019422 A1* | 1/2008 | Smith | .................... | H04B 1/692 |
| | | | | 375/136 |
| 2009/0086791 A1* | 4/2009 | Bienas | ................. | H04B 1/7143 |
| | | | | 375/132 |
| 2015/0358946 A1* | 12/2015 | Wang | .................... | H04L 5/0053 |
| | | | | 370/329 |

OTHER PUBLICATIONS

Attach please find the International Search Report for the PCT/FR2017/051606 application.

\* cited by examiner

DATA TRANSMISSION/RECEPTION BY FREQUENCY HOPPING

FIELD OF THE INVENTION

The present invention relates to the transmission/reception of data by frequency hopping, for example in a radio frequency communication system.

BACKGROUND OF THE INVENTION

Very low bitrate and long range radio frequency communication systems are becoming more prevalent. In fact, this long range expresses the capacity of the radio system to sustain greater attenuation than is customary in the radio channel, which requires increased sensitivity of the receiver.

To achieve these high sensitivities, it is usually proposed to reduce the bandwidth of the radio signal as much as possible, the cost being a very low nitrate. The lover the bandwidth, the lower the noise power collected by the receiver, while the energy of the signal concerned remains the same.

As the disadvantage is a particularly low information nitrate, this approach is reserved for transmitters of very low cost and complexity which transmit only very small amounts of data. For example, these typically are autonomous sensors spread across an environment to be monitored (such as objects connected in a LoRaWan® or Sigfox® network, or GPRS/3G, LTE/4G, or other network) or elements of an "Internet of Things".

The logical consequence of the reduction in bandwidth of the radio channel is its evolution into a model without frequency selection. This choice can result in deep fading phenomena affecting the entire radio signal. To prevent this phenomenon from significantly altering the radio link, it is important that the operators size the link budget of the radio link to have a significant operating margin, which limits the effective range of these networks accordingly.

Spread spectrum techniques, and typically frequency hopping, have been developed to combat this exact phenomenon which is typical of narrowband channels. In general terms, frequency hopping consists of sequentially transmitting/receiving a signal on multiple distinct successive frequencies. A time sequence of successive frequency hops is defined, at the transmitter and at the receiver.

However, the use of this technique requires a high level of performance (in terms of stability and speed of oscillators) and a very good quality of synchronization from the radio frequency stages of the terminals, which is both complex electronically and expensive in terms of energy consumption.

These techniques thus remain out of reach for the most limited devices.

The present invention improves the situation.

BRIEF SUMMARY OF THE INVENTION

For this purpose, it proposes a method for the telecommunication of data by frequency hopping in a first frequency band, wherein the frequency hops follow a predefined time sequence, known at least to a data transmitter, characterized in that it comprises the following steps implemented by said data transmitter.

defining, from a pseudo-random sample, successive values of respective differences in frequency in order to determine the hopping time sequence starting at a first frequency, transmitting, to at least one data receiver
at a first frequency, said first frequency being randomly selected within the first frequency band,
then at successive frequencies which, starting at the first frequency, comply with said successive values of respective differences in frequency, said successive values of differences in frequency defining, at reception, a succession of reception frequencies for useful data to be received from said data transmitter.

Thus, the frequency hopping model is adapted to the constraints of systems which usually use "Ultra Narrow Band" approaches, without having their limitations and while maintaining the long-range properties of the system. The transmission is distributed over a set of different channels, ensuring the distribution of information over a substantial portion of the spectrum (in practice, possibly over the entire frequency band of the network) and thereby placed in a wideband channel, therefore frequency selective.

Said "first frequency band", from which the first frequency is randomly selected, may correspond to the entire accessible transmission/reception spectrum.

In one embodiment, the method comprises a step prior to transmission, wherein:
after randomly selecting the first frequency, the transmitter listens in the first band for said first frequency before any transmission, to verify the availability of a transmission channel corresponding to the first frequency, and;
if the channel is free, proceeds with a transmission on the first frequency and then at successive frequencies in compliance with said differences in frequency,
if the channel is busy:
randomly selects another first frequency,
and repeats the verification of availability of the corresponding transmission channel, until an available channel is found.

Such an embodiment advantageously allows judiciously choosing the best "first frequency" at which the transmission can be carried out according to said sequence.

In one embodiment, the transmitter sends:
synchronization data at the first frequency, then at a first set of successive frequencies with differences in frequency between the successive frequencies of this first set, starting at the first frequency, which are representative of said successive values of respective differences in frequency of the time sequence,
then useful data, at the first frequency then at a second set of successive frequencies which, starting at the first frequency, comply with said successive values of respective differences in frequency of said time sequence.

Thus, in this embodiment, the transmitter transmits, at a random moment, a first data portion (comprising for example a synchronization signal) on a channel selected randomly and without prior agreement with the receiver. Then, the rest of the signal is transmitted while observing a series of displacements in the spectrum according to a sequence of pseudo-random hops and at a rhythm which are known at least to the transmitter and possibly to the receiver in a first embodiment.

In one embodiment, the first set is identical to the second set.

Thus, the first transmission frequency is maintained for the synchronization, as for the transmission of useful data, as well as the successive differences in frequency. However, this implementation allows variants. For example, the frequencies of the first set may all be within a narrower frequency band than a frequency band containing the frequencies of the second set. This embodiment for example allows reducing, at the receiver, the complexity of the search for frequencies used for synchronization, in a reduced frequency band. It can typically be narrower than the aforementioned first frequency band.

In one embodiment, the transmitter repeats said data transmission sequence a predefined number of times, at said first frequency then at said successive frequencies.

Thus, the hop sequence is not specified as a series of channels or frequencies but only as a sequence of frequency changes of more or less N Hz. Thus, the entire sequence is only defined relatively, with respect to the initial transmission. The absolute frequencies at which the transmissions are carried out are not known to the receiver (or even possibly to the transmitter, to reduce its complexity). When the entire sequence has been traveled, then in this embodiment it is reused in a loop as many times as necessary (by communication redundancy). This communication redundancy allows the receiver to identify completely the entire sequence of hops. If it is chosen to first send a synchronization signal before sending useful data, once the entire synchronization signal has been transmitted (transmission of at least one iteration of the hop sequence), the transmitter begins transmitting useful data, using either the same hop sequence or some other sequence defined based on the hop sequence of the synchronization signal.

In one embodiment, at least a portion of the respective differences in frequency of the sequence contributes to defining an identifier of the transmitter.

For example, a first portion of the respective differences in frequency of the sequence can contribute to defining a membership group of the transmitter, while a second portion of the respective differences in frequency of the sequence can contribute to defining the identifier specific to the transmitter within that group.

In addition, the hops from one frequency to another in the sequence are defined at successive time intervals which are variable within the sequence, and these successive time intervals may also further contribute to defining an identifier of the transmitter.

Thus, in an advantageous but optional embodiment, it is possible to encode information, for example such as the address of the transmitter, in the actual sequence of frequency hops by changing the value of the frequency hop according to the data symbol to be carried. For example, the differences in frequency defining the frequency hop can characterize the transmitter. In that particular case, knowledge of the transmitter address may allow, for example, using a different sequence of hops specific to the transmitter/receiver pair for the rest of the exchange. For example, the sequence of hops identified during synchronization allows identifying the transmitter and communicating with the transmitter according to another predefined sequence of hops (for example stored in a database where it is linked to some identifier of the transmitter).

In one embodiment, a receiver, to which data is to be sent, scans the first frequency band to identify the first frequency and a first portion at least of said successive frequencies which, starting at the first frequency, comply with said successive values for the respective differences in frequency. In particular, this first portion at least of the successive frequencies allows the receiver to identify the succession of reception frequencies for useful data to be received from the data transmitter.

In one exemplary embodiment, the receiver is connected to a database storing pseudo-random samples defining sequences used in transmission by one or more transmitters, and on the basis of said first portion at least of the successive frequencies, the receiver:
  determines successive differences in frequency starting at the first frequency identified by scanning the first frequency band,
  compares said successive differences in frequency, to differences in frequency of sequences corresponding to the pseudo-random samples stored in the database, and
  identifies, on the basis of said comparison, the time sequence used by the transmitter for receiving useful data on the successive frequencies of the sequence thus identified.

For example, the database can store pseudo-random samples defining sequences used for the transmission of synchronization data. In this case, the transmitter and receiver use a predetermined rule, known to the transmitter and receiver, to define a sequence for respectively transmitting and receiving useful data based on a sequence used for the transmission of synchronization data.

The data are therefore not transmitted on a single channel but rather over all of the band accessible to the system, which provides the benefits of a broadband channel while preserving the sensitivity of selective frequencies. It is preferable to provide a scheme of redundancy and interleaving which is sized to ensure sufficient independence between data transmitted on the same channel.

Thus, the receiver monitors the full radio frequency band of interest, since it does not know the exact first frequency at which the transmitter is transmitting, by performing a continuous spectral analysis of a resolution in accordance with the instantaneous bandwidth of the narrowband system. When transmission begins, the appearance of an energy peak in a given sub-band is observed, then a successive series of energy peaks reproducing a known sequence of frequency hops. The identification of this sequence, based on the difference between each of these energy peaks, enables the receiver to recognize a signal of interest within the noise. As it is of course possible that some of these energy peaks are not detectable, due to unforeseen situations in the radio channel, in one embodiment the sequence may be issued redundantly in order to determine a sequence with a reasonable degree of certainty, and the identification of the actual sequence can be accomplished by comparing the sequence to known sequences of the receiver in a database of known sequences.

Once the hop sequence is identified, the receiver is then synchronized with the transmitter to the extent that it can predict the frequency hops performed by the transmitter. Transmission of useful data can then begin.

The term "pseudo-random sequence" is understood to mean any sequence known to the transmitter and identifiable by the receiver according to a predetermined rule. This sequence may follow certain logic (such as +100 Hz, +100 Hz, +100 Hz, at each hop), or may not and be effectively random.

Figure 1:
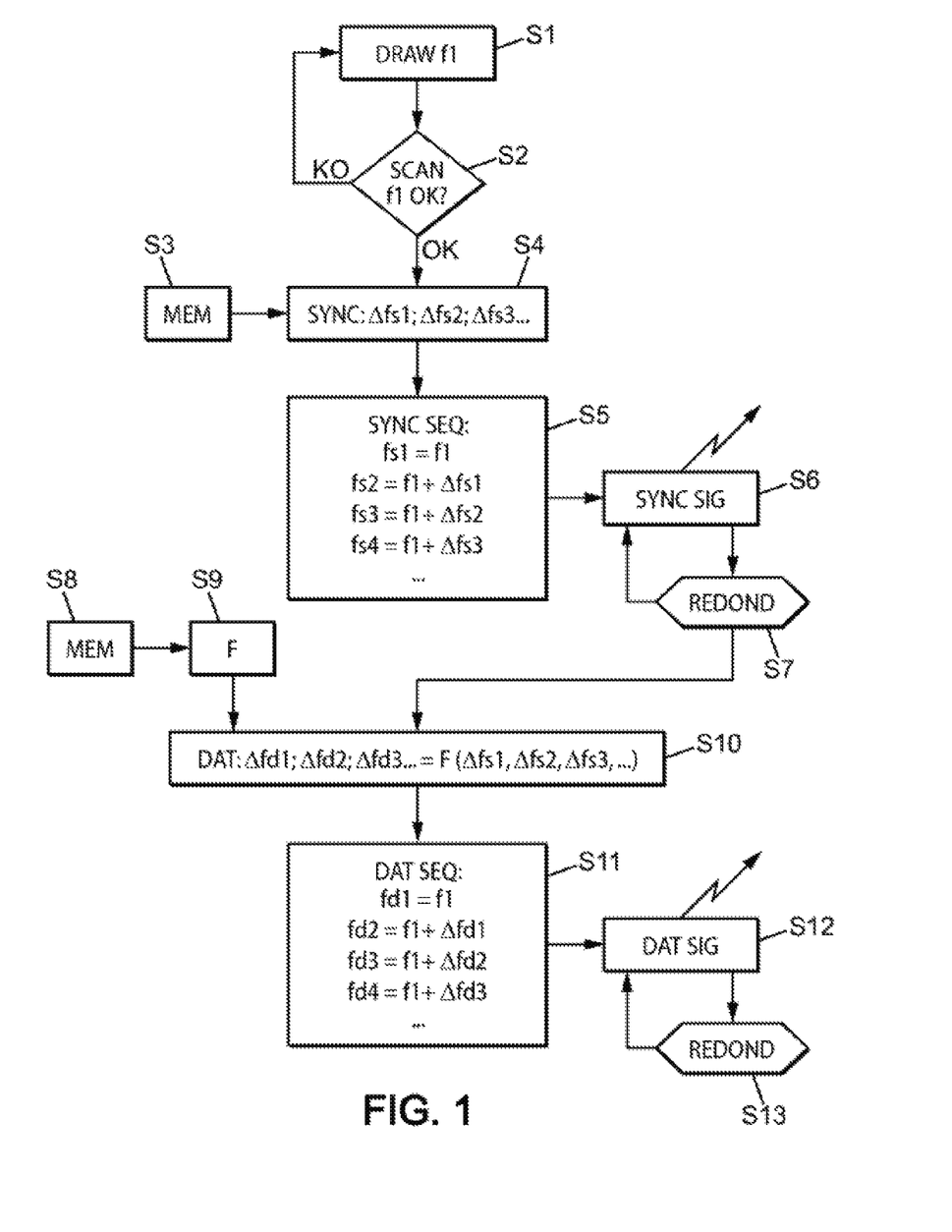
FIG. 1 shows a flowchart illustrating the steps implemented by a transmitter within the meaning of the invention.

The present invention also provides a data transmitter comprising a logic circuit programmed to in the above method. FIG. 1 shows a flowchart which can correspond to a computer program executed by such a transmitter.

Figure 2:
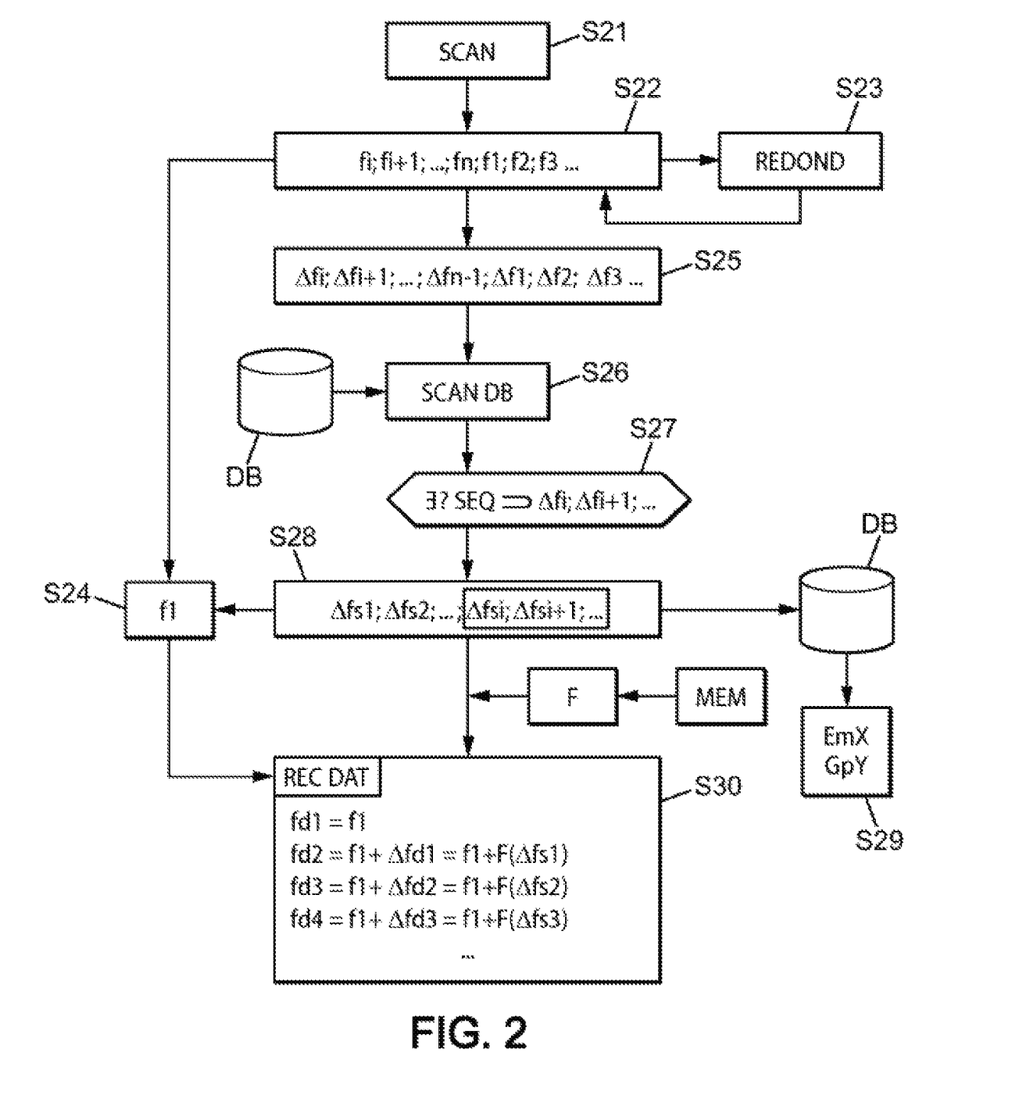
FIG. 2 shows a flowchart illustrating the steps implemented by a receiver within the meaning of the invention.

The present invention also provides a system comprising at least one transmitter of the above type, and a receiver comprising a logic circuit programmed to implement the method as defined above, in relation to the steps implemented by a receiver. FIG. 2 shows a flowchart which can correspond to a computer program executed by such a receiver.

The present invention also relates to such a receiver.

The present invention relates to a computer program comprising instructions for implementing the method according to the invention, when this program is executed by a processor. The instructions of this program can be distributed in a memory of the transmitter and/or a memory of a receiver, to be executed by a respective processor of the transmitter and/or receiver.

BRIEF DESCRIPTION OF THE DRAWINGS

Other features and advantages of the invention will be apparent from examining the following detailed description of some exemplary embodiments and the appended drawings in which.

DETAILED DESCRIPTION OF THE INVENTION

Referring to FIG. 1 which illustrates the implementation of an exemplary embodiment of the method at a transmitter, in a first step S1, the transmitter randomly selects a frequency f1 within the entire band of available frequencies (said "first frequency band", for example around 868 MHz for LoRA® or Sigfox®).

In one particular embodiment, in step S2, the transmitter listens for whether or not the channel corresponding to this frequency f1 is busy, and if this frequency is busy (KO arrow exiting test S2), randomly selects a different other frequency f1, and again checks the availability of the corresponding channel. The transmitter may for example perform this verification step according to the principle of "CSMA" ("Carrier sense multiple access") or "LBT" ("Listen before talk"). The new frequency tested is different from the initial value, for example by a selected distance (typically greater than the bandwidth of the useful signal). In this manner it is possible to take advantage of the degree of freedom provided by the random selection of the first frequency f1, to limit the risk of collision between transmissions from different transmitters even if they share a same portion at least of the hop sequence $\Delta fs1, \Delta fs2, \Delta fs3, \ldots$ After choosing a frequency f1 whose channel is available, in step S3 a processor comprised in the transmitter finds, by accessing a memory MEM comprised in the transmitter, the data of a previously saved pseudo-random code. The data in this code indicate in step S4 the respective differences in frequency $\Delta fs1, \Delta fs2, \Delta fs3, \ldots$ to be applied, starting at an initial frequency f1, for transmitting the synchronization data SYNC in the corresponding frequencies fs1, fs2, fs3, fs4, ..., in the embodiment described by way of example here.

Thus, in step S5, these successive frequencies fs1, fs2, fs3, fs4, ..., are constructed as follows:
fs1=f1,
fs2=f1+$\Delta fs1$,
fs3=f1+$\Delta fs2$,
fs4=f1+$\Delta fs3$, etc.

Alternatively, these frequencies may be defined differently, for example as follows:

fs1=f1,
fs2=fs1+$\Delta fs1$,
fs3=fs2+$\Delta fs2$,
fs4=fs3+$\Delta fs3$, etc.

In one embodiment, the data of the code may define a transmission duration at each frequency (for example, 500 ms at fs1, then 300 ms at fs2, then 600 ms at fs3, etc.). In a simpler embodiment, the durations may instead be constant.

A synchronization signal may then be sent at a first time, in step S6, to these transmission frequencies fs1, fs2, fs3, fs4, ... and at a rhythm as defined above.

Preferably, the transmitter redundantly sends the synchronization signal at these successive frequencies in step S7. This redundancy defines the sending of the sequence a predefined number of times (for example two or three times, or more), so that a receiver can find the entire sequence of successive frequencies.

The transmitter can then send the useful data DAT. In one particular embodiment described below, the frequencies chosen for sending useful data are different from the frequencies used for sending synchronization data.

In one possible embodiment, the transmitter may have in its memory MEM another sequence that defines another pseudo-random code for the sending of useful data, or may use the memory MEM in step S8 to find a function F which enables, in step S9, in general obtaining the differences in frequency to use to define the transmission frequencies of the useful data, based on the differences in frequency used to send synchronization data.

Thus in step S10, the transmitter can obtain the differences in frequency for sending useful data, denoted $\Delta fd1$, $\Delta fd2, \Delta fd3, \ldots$ and obtained by applying function F to the differences in frequency for sending synchronization data $\Delta fs1, \Delta fs2, \Delta fs3, \ldots$, which is:
$\Delta fd1, \Delta fd2, \Delta fd3, \ldots = F(\Delta fs1, \Delta fs2, \Delta fs3, \ldots)$ For example, by using the following numerical values:
$\Delta fs1=+30$ Hz, $\Delta fs2=-50$ Hz, $\Delta fs3=+80$ Hz, ... one can define a very simple affine function of the type: $\Delta fdi=10\times \Delta fsi$, such that $\Delta fd1=+300$ Hz, $\Delta fd2=-500$ Hz, $\Delta fd3=+800$ Hz, ...

Such an embodiment allows for example reducing the complexity of the receiver and only having to listen for the sequence of the synchronization signal on a reduced frequency band (for example −100 Hz+f1 to 100 Hz+f1). Once the synchronization sequence is recognized, the receiver can then progressively be positioned in all the frequencies for receiving useful data, which may be located in a wider band (for example said first frequency band).

This embodiment more generally allows preventing an intruder receiver which has received the sequence of synchronization data, from immediately identifying the sequence of useful data.

Moreover, the sequence used for synchronization can be shorter than the sequence used for the transmission of useful data (the second sequence always being deduced from the first by a predefined function, or storage of corresponding code in memory), to allow a transmitter to reduce the amount of data to be transmitted and thus save resources.

Next, in the following step S11, the set of transmission frequencies for the useful data may be constructed as follows:
fd1=f1,
fd2=f1+$\Delta fd1$,
fd3=f1+$\Delta fd2$,
fd4=f1+$\Delta fd3$, etc.

Here, for the sake of simplicity, the first frequency f1 is chosen to be the same for the transmission of synchronization data and the transmission of useful data, since the associated channel has been detected as available. However, alternatively, the sequence of differences in frequency for synchronization may also define a first frequency fd1 that is different from f1, for the transmission of useful data.

In step S12, the useful data can be sent to these successive transmission frequencies fd1, fd2, fd3, . . . , possibly with redundancy in step S13.

We now refer to FIG. 2 to describe an exemplary embodiment of a counterpart process performed by the receiver. In step S21 of FIG. 2, the receiver scans the entire frequency band (said "first band") and receives in step S22 a succession of synchronization data at different reception frequencies fi, fi+1, . . . , fn, f1, f2, f3, . . . , the redundancy in receiving these data in step S23 making it possible to define all of these reception frequencies.

If a synchronization pulse is provided between transmission at and transmission at f1, then it is possible to determine f1 and from this the differences in frequency $\Delta f1$, $\Delta f2$, $\Delta f3$, etc.

Alternatively, in one exemplary embodiment, one can require that the pseudo-random sequence for the transmission/reception of synchronization data at least, satisfies a selected property, for example that the algebraic sum of the differences in frequency $\Delta f1$, $\Delta f2$, $\Delta f3$ . . . is zero.

Thus, the average of the received frequencies fi, fi+1, . . . , fn, f1, f2, f3, . . . , must equal the first frequency f1. One can also verify that the algebraic sum of the differences between frequencies received is zero, to ensure that the different frequencies received do indeed come from the same transmitter for example, and typically to ignore the frequencies that no longer appear in the redundancies.

From the first frequency f1 thus determined in step S24, the associated differences in frequency are determined in step S25:

$\Delta fi = fi - f1$, $\Delta fi+1 = (fi-1) - (f1)$, etc.

In step S26, the receiver refers to a previously saved database DB of sequences of differences in frequency, each sequence being for example specific to a transmitter (or group of transmitters) with which it can communicate. The receiver thus has, in the received differences $\Delta fi$, $\Delta fi+1$, etc., at least a portion of the corresponding sequence previously saved in a memory MEM of the receiver. In step S27, the receiver can execute for example a comparison routine ("matching algorithm") in order to identify in step S28, in the database DB, the sequence $\Delta fs1$, $\Delta fs2$, $\Delta fs3$, . . . , $\Delta fsi$, $\Delta fsi+1$, . . . , $\Delta fsn$, corresponding to that received sequence portion $\Delta fi$, $\Delta fi+1$, etc. Optionally, the respective reception delays at each frequency fi, fi+1, etc. may also help identify the sequence in the database DB.

At this stage, in step S29, the receiver can deduce from the identified sequence that the transmitter listed as corresponding to this sequence in the database DB is a transmitter of identifier EmX, belonging to a group of transmitters GpY because it has for example a sequence portion in common with the transmitters of this group GpY (for example the beginning of the sequence: $\Delta fs1$, $\Delta fs2$, $\Delta fs3$).

In step S30, the receiver constructs the succession of frequencies in order to await the reception of useful data in the successive channels corresponding to these frequencies, starting with the sequence $\Delta fs1$, $\Delta fs2$, $\Delta fs3$, etc. so identified. In one exemplary embodiment, the reception frequencies are defined, as indicated above with reference to FIG. 1, from the frequency f1 and the sequence $\Delta fs1$, $\Delta fs2$, $\Delta fs3$ . . . , as follows:

fd1 = f1,
fd2 = f1 + $\Delta fd1$,
fd3 = f1 + $\Delta fd2$,
fd4 = f1 + $\Delta fd3$, etc.

where $\Delta fd1$, $\Delta fd2$, . . . = F($\Delta fs1$, $\Delta fs2$, . . . ), F being the function predefined in the transmitter and receiver and for which the data can be stored in a memory MEM of the receiver.

For example:

$\Delta fd1 = 10 \Delta fs1$;

$\Delta fd2 = 10 \Delta fs2$; etc.

In the above example, different differences in frequency are described for the transmission of synchronization/timing data and for the transmission of useful data. However, the differences may be the same in these two transmissions. Moreover, one will further note that it is not necessarily required to provide a transmission of synchronization data, the redundancy in the transmission of useful data making it possible to ensure the reception of all frequencies fd1, fd2, fd3, . . . fdn, and from this to deduce the first frequency f1 and the sequence used $\Delta fd1$, $\Delta fd2$, $\Delta fd3$, for the transmission of useful data. It should be more generally noted that the sequence generated pseudo-randomly at the transmitter does not need to be known to the receiver. Indeed, due to redundancy, knowledge of the entire sequence can be deduced from a predetermined rule (for example the algebraic sum of the differences $\Delta f1$, $\Delta f2$, $\Delta f3$, etc., is zero, and the average frequency corresponds to the first frequency f1).

Figure 3:
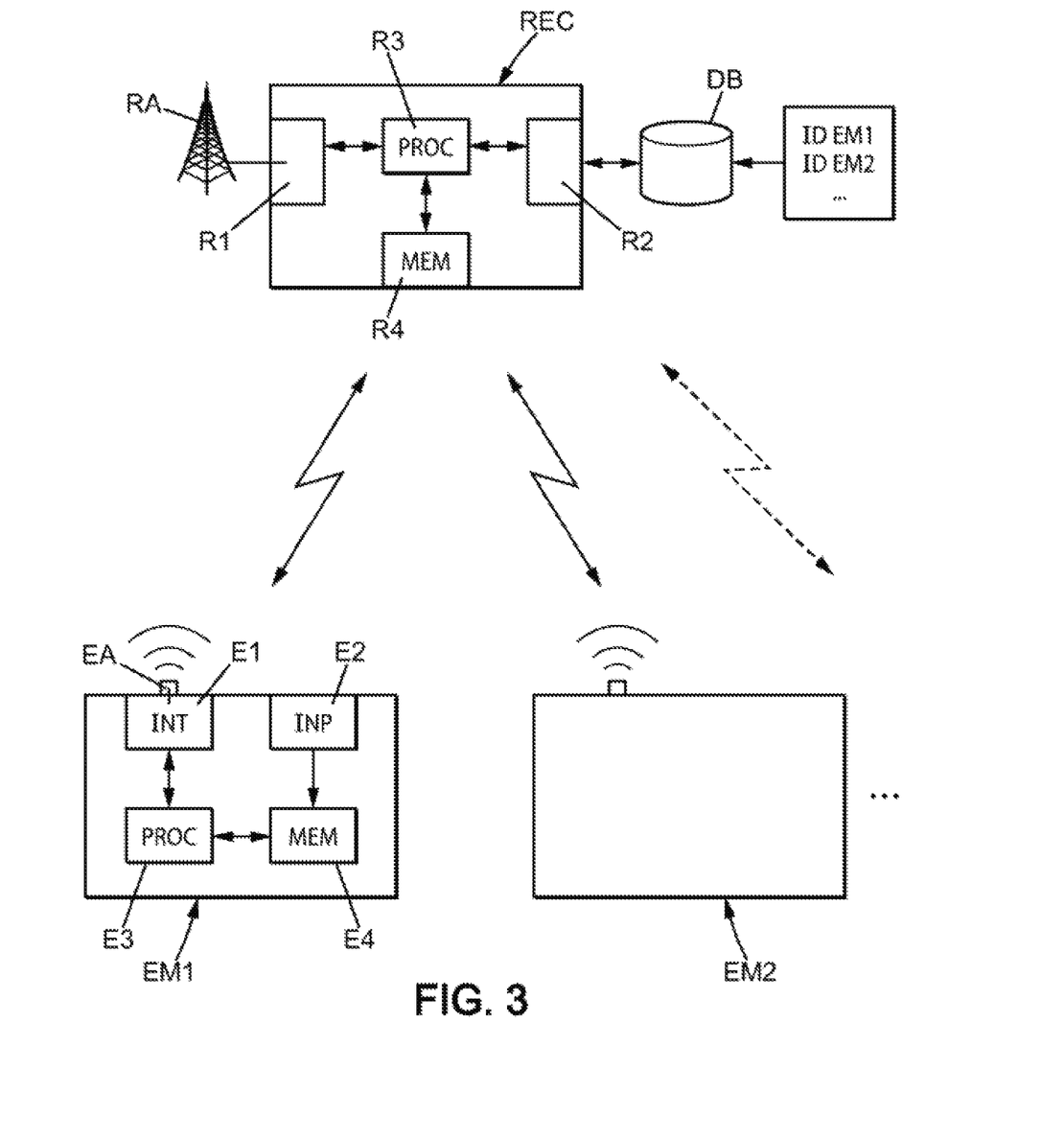
FIG. 3 schematically illustrates a system comprising a transmitter and a receiver within the meaning of the invention

Illustrated in FIG. 3 are the hardware components of a system having a receiver and one or more transmitters according to an exemplary embodiment of the invention. In the illustrated example, the receiver REC comprises a reception antenna RA, connected by an interface R1 to a processor R3 capable of interpreting the received signals and deducing the respective sequences therefrom, by communicating with a memory R4 which typically stores instructions of a computer program within the meaning of the invention, as well as any temporary data. This memory R4 may further store the contents of the database, or alternatively may communicate via the interface R2 with a remote database DB which also stores transmitter identifiers ID EMI, ID EM2, etc. (and/or transmitter groups).

For example, a corresponding transmitter EMI typically comprises an antenna EA connected via an interface E1 to a processor E3 in order to form the data signals to be transmitted (synchronization or useful data), in a sequence constructed by communicating with a memory E4 which typically stores instructions of a computer program within the meaning of the invention (as well as any temporary data). The transmitter EMI may further comprise another interface E2 for accessing the memory E4 and storing in it said instructions, as well as the pseudo-random code defining the sequence used for the transmission of synchronization data and/or the sequence used for the transmission of useful data.

Compared to the prior art, the approach of the invention provides the following advantages over conventional frequency hopping systems:

it requires no prior synchronization, neither in time nor in frequency, between transmitter and receiver, since the receiver fully adapts to the transmissions of the transmitter: the receiver is therefore particularly suitable for transmitters equipped with oscillators of low quality and therefore having very limited control over their actual transmission frequency, which is typically the case for the low-cost, low-power terminals in the Internet of Things;

unlike most frequency hopping systems, no agreement on an initial frequency or initial transmission channel is required to trigger the start of the frequency hopping (typical case of the first hop frequency, used in common channels): this first transmission can occur anywhere in the spectrum; it is not more indispensable than the signal fragments that follow, which can also increase system robustness against interference;

the ability to transmit information in the hop sequence itself is another advantage (even during the receiver's synchronization search): this allows considering a frequency hopping system that uses a plurality of hop sequences in a same transmission, to optimize use of the radio resource, for example, a unique starting hop sequence associated with a given group of transmitters can be used to initiate synchronization (possibly including basic information concerning this group of transmitters), then a complementary portion in the synchronization sequence can be characteristic of one of those transmitters for the actual communication portion with that transmitter.

The result is essentially better stealth and greater ruggedness, and in particular a general relaxation of the constraints on radio implementation, which makes frequency hopping systems accessible to the most limited radio systems.

However the bitrates necessarily remain low, and some of the complexity is transferred to the receiver. Nevertheless, in an application in connected objects, this constraint can be satisfied since the receivers are much less limited than the transmitters. This is already the case in very narrowband systems. Compared to conventional narrowband systems, the main advantage of the invention is that it enables them to take advantage of a broadband radio channel without compromising their goals of cost and very low power consumption, or the sensitivity of the system.

The algorithm enabling the receiver to synchronize to the frequency hop sequence by using only the distances between consecutive hops, without the use of an absolute reference, provides both robustness against the loss of information, and reliability in the acquisition of synchronization in a "legitimate" signal (in the sense where the identity of the transmitter is assured by this means).

The invention is advantageous for use in an Internet of Things context, which requires a capacity for communication that is both robust and reliable but also inexpensive and energy efficient, for objects incapable of receiving the usual communications means primarily for reasons of cost and energy consumption. In fact, for a negligible additional cost, this invention provides increased flexibility and robustness to existing radio interfaces designed for this type of use, while rendering the radio link more reliable.

The invention claimed is:

1. A method for the telecommunication of data by frequency hopping in a first frequency band, wherein the frequency hops follow a predetermined time sequence, known at least to a data transmitter, characterized in that it comprises the following acts implemented by said data transmitter:

defining, from a pseudo-random sample, successive values of respective differences in frequency ($\Delta fs1$, $\Delta fs2$, $\Delta fs3$, ... ; $\Delta fd1$, $\Delta fd2$, $\Delta fd3$, ... ) in order to determine the hopping time sequence starting at a first frequency (f1), transmitting to at least one data receiver
at a first frequency (f1), said first frequency being randomly selected (S1) within the first frequency band,
then at successive frequencies (S5) which, starting at the first frequency, comply with said successive values of respective differences in frequency, said successive values of differences in frequency defining, at reception, a succession of reception frequencies for useful data to be received from said data transmitter.

2. The method of claim 1, comprising an act prior to transmission, wherein:

after randomly selecting the first frequency, the transmitter listens (S2) in the first band for said first frequency before any transmission, to verify the availability of a transmission channel corresponding to the first frequency, and:

if the channel is free, proceeds with a transmission on the first frequency and then at successive frequencies in compliance with said differences in frequency, if the channel is busy:
randomly selects another first frequency,
and repeats the verification of availability of the corresponding transmission channel, until an available channel is found.

3. The method of claim 1, wherein the transmitter sends:
synchronization data at the first frequency (fs1=f1), then at a first set of successive frequencies (fs2, fs3, ... ) with differences in frequency ($\Delta fs1$, $\Delta fs2$, $\Delta fs3$, ... ) between the successive frequencies of this first set, starting at the first frequency, which are representative of said successive values of respective differences in frequency of the time sequence ($\Delta fd1$, $\Delta fd2$, $\Delta fd3$, ... ), then useful data, at the first frequency (fd1=f1) then at a second set of successive frequencies which, starting at the first frequency, comply with said successive values of respective differences in frequency of said time sequence ($\Delta fd1$, $\Delta fd2$, $\Delta fd3$, ... ).

4. The method of claim 3, wherein the first set (fs2, fs3, ... ) is identical to the second set (fd2, fd3, ... ).

5. The method of claim 1, wherein the first frequency and the successive frequencies define a data transmission sequence, and further wherein the transmitter repeats said data transmission sequence (S7; S13) a predefined number of times, at said first frequency then at said successive frequencies.

6. The method of claim 1, wherein at least a portion of the respective differences in frequency of the sequence contributes to defining an identifier of the transmitter (S29).

7. The method of claim 6, wherein a first portion of the respective differences in frequency of the sequence contributes to defining a membership group (GpY) of the transmitter and a second portion of the respective differences in frequency of the sequence contributes to defining the identifier specific to the transmitter (EmX) within that group.

8. The method of claim 6, wherein the hops from one frequency to another in the sequence are defined at successive time intervals which are variable within the sequence, and wherein said successive time intervals further contribute to defining an identifier of the transmitter.

9. The method of claim 1, wherein a receiver, to which data is to be sent, scans the first frequency band (S21) to identify the first frequency (S24) and a first portion at least of said successive frequencies which, starting at the first frequency, comply with said successive values for the respective differences in frequency ($\Delta fi$, $\Delta fi+1$, ... ), said first portion at least of said successive frequencies allowing the receiver to identify (S28) the succession of reception frequencies for useful data to be received from the data transmitter.

10. The method of claim 9, wherein the receiver is connected to a database (DB) storing pseudo-random samples defining sequences used in transmission by one or more transmitters, and wherein, on the basis of said first portion at least of said successive frequencies, the receiver:
  determines successive differences in frequency (S25) starting at the first frequency identified by scanning the first frequency band (S24),
  compares (S27) said successive differences in frequency, to differences in frequency of sequences corresponding to the pseudo-random samples stored in the database, and
  identifies (S28), on the basis of said comparison, the time sequence used by the transmitter for receiving (S30) useful data on the successive frequencies of the sequence thus identified.

11. A non-transitory computer-readable storage medium storing a code of a computer program, characterized in that said computer program comprises instructions for implementing the method according to claim 1 when this program is executed by a processor.

12. A method for the telecommunication of data by frequency hopping in a first frequency band, wherein the frequency hops follow a predetermined time sequence, known at least to a data transmitter, characterized in that it comprises the following acts implemented by said data transmitter:
  defining, from a pseudo-random sample, successive values of respective differences in frequency ($\Delta fs1$, $\Delta fs2$, $\Delta fs3$, ...; $\Delta fd1$, $\Delta fd2$, $\Delta fd3$, ...) in order to determine the hopping time sequence starting at a first frequency (f1),
  transmitting to at least one data receiver
    at a first frequency (f1), said first frequency being randomly selected (S1) within the first frequency band,
    then at successive frequencies (S5) which, starting at the first frequency, comply with said successive values of respective differences in frequency, said successive values of differences in frequency defining, at reception, a succession of reception frequencies for useful data to be received from said data transmitter;
  wherein the transmitter sends:
  synchronization data at the first frequency (fs1=f1), then at a first set of successive frequencies (fs2, fs3, ...) with differences in frequency ($\Delta fs1$, $\Delta fs2$, $\Delta fs3$, ...) between the successive frequencies of this first set, starting at the first frequency, which are representative of said successive values of respective differences in frequency of the time sequence ($\Delta fd1$, $\Delta fd2$, $\Delta fd3$, ...),
  then useful data, at the first frequency (fd1=f1) then at a second set of successive frequencies which, starting at the first frequency, comply with said successive values of respective differences in frequency of said time sequence ($\Delta fd1$, $\Delta fd2$, $\Delta fd3$, ...)
  wherein a receiver, to which data is to be sent, scans the first frequency band (S21) to identify the first frequency (S24) and a first portion at least of said successive frequencies which, starting at the first frequency, comply with said successive values for the respective differences in frequency ($\Delta fi$, $\Delta fi+1$, ...), said first portion at least of said successive frequencies allowing the receiver to identify (S28) the succession of reception frequencies for useful data to be received from the data transmitter;
  wherein the receiver is connected to a database (DB) storing pseudo-random samples defining sequences used in transmission by one or more transmitters, and wherein, on the basis of said first portion at least of said successive frequencies, the receiver:
  determines successive differences in frequency (S25) starting at the first frequency identified by scanning the first frequency band (S24),
  compares (S27) said successive differences in frequency, to differences in frequency of sequences corresponding to the pseudo-random samples stored in the database, and
  identifies (S28), on the basis of said comparison, the time sequence used by the transmitter for receiving (S30) useful data on the successive frequencies of the sequence thus identified, wherein the database stores pseudo-random samples defining sequences used for the transmission of synchronization data, and wherein the transmitter and receiver use a predetermined rule (F), known to the transmitter and receiver, to define a sequence for respectively transmitting (S9) and receiving useful data based on a sequence used for the transmission of synchronization data.

13. A data transmitter (Em1), comprising a logic circuit programmed to implement a method for the telecommunication of data by frequency hopping in a first frequency band, wherein the frequency hops follow a predetermined time sequence, known at least to a data transmitter, characterized in that it comprises the following acts implemented by said data transmitter:
  defining, from a pseudo-random sample, successive values of respective differences in frequency ($\Delta fs1$, $\Delta fs2$, $\Delta fs3$, ...; $\Delta fd1$, $\Delta fd2$, $\Delta fd3$, ...) in order to determine the hopping time sequence starting at a first frequency (f1),
  transmitting to at least one data receiver
    at a first frequency (f1), said first frequency being randomly selected (S1) within the first frequency band,
    then at successive frequencies (S5) which, starting at the first frequency, comply with said successive values of respective differences in frequency, said successive values of differences in frequency defining, at reception, a succession of reception frequencies for useful data to be received from said data transmitter.

14. A system comprising at least one data transmitter (Em1), comprising a logic circuit programmed to implement a method for the telecommunication of data by frequency hopping in a first frequency band, wherein the frequency hops follow a predetermined time sequence, known at least to a data transmitter, characterized in that it comprises the following acts implemented by said data transmitter:
  defining, from a pseudo-random sample, successive values of respective differences in frequency ($\Delta fs1$, $\Delta fs2$, $\Delta fs3$, ...; $\Delta fd1$, $\Delta fd2$, $\Delta fd3$, ...) in order to determine the hopping time sequence starting at a first frequency (f1),
  transmitting to at least one data receiver
    at a first frequency (f1), said first frequency being randomly selected (S1) within the first frequency band,
    then at successive frequencies (S5) which, starting at the first frequency, comply with said successive values of respective differences in frequency, said successive values of differences in frequency defining, at reception, a succession of reception frequencies for useful data to be received from said data transmitter;

and a receiver (REC), to which data is to be sent, comprising a logic circuit programmed to scans the first frequency band (S21) to identify the first frequency (S24) and a first portion at least of said successive frequencies which, starting at the first frequency, comply with said successive values for the respective differences in frequency ($\Delta f_i$, $\Delta f_{i+1}$, . . . ), said first portion at least of said successive frequencies allowing the receiver to identify (S28) the succession of reception frequencies for useful data to be received from the data transmitter.

15. The receiver (REC) of a system according to claim 14.

* * * * *

UNITED STATES PATENT AND TRADEMARK OFFICE
CERTIFICATE OF CORRECTION

PATENT NO. : 10,587,305 B2
APPLICATION NO. : 16/306857
DATED : March 10, 2020
INVENTOR(S) : Jean Schwoerer It is certified that error appears in the above-identified patent and that said Letters Patent is hereby corrected as shown below:

In the Specification

At Column 1, Line 19, please replace "nitrate" with – bitrate –
At Column 1, Line 19, please replace "lover" with – lower –

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*